US010697787B2

(12) United States Patent
Sakurai et al.

(10) Patent No.: US 10,697,787 B2
(45) Date of Patent: Jun. 30, 2020

(54) DETOUR RECOMMENDED AREA ESTIMATION SYSTEM, DETOUR RECOMMENDED AREA ESTIMATION PROGRAM, AND NAVIGATION DEVICE

(71) Applicant: TOYOTA JIDOSHA KABUSHIKI KAISHA, Toyota-shi, Aichi-ken (JP)

(72) Inventors: Yoko Sakurai, Toyohashi (JP); Xin Jin, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 191 days.

(21) Appl. No.: 15/903,833

(22) Filed: Feb. 23, 2018

(65) Prior Publication Data
US 2018/0245936 A1   Aug. 30, 2018

(30) Foreign Application Priority Data
Feb. 27, 2017   (JP) .................................. 2017-034803

(51) Int. Cl.
*G01C 21/34* (2006.01)
(52) U.S. Cl.
CPC ................................ *G01C 21/3461* (2013.01)

(58) Field of Classification Search
CPC ......... G01C 21/3461; G08G 1/096811; G08G 1/096827; G08G 1/096838; G08G 1/096844
USPC ........................................................ 701/450
See application file for complete search history.

(56) References Cited

U.S. PATENT DOCUMENTS 7,120,539 B2 *  10/2006  Krull ................... G01C 21/3415
                                                        701/411

FOREIGN PATENT DOCUMENTS

JP      2002-156236 A      5/2002

* cited by examiner

*Primary Examiner* — Anthony R Jimenez
(74) *Attorney, Agent, or Firm* — Hunton Andrews Kurth LLP

(57) ABSTRACT

A detour recommended area estimation system includes: a recording medium; and a control unit configured to collect probe information from a vehicle; acquire a travel-avoided direction based on the probe information when the vehicle made a detour, the travel-avoided direction being a direction in which the vehicle would have been traveled if the detour had not been made; estimate an area in which a direction dependence degree of the travel-avoided direction is less than a reference value as a detour recommended area, and record the detour recommended area in a recording medium.

8 Claims, 3 Drawing Sheets

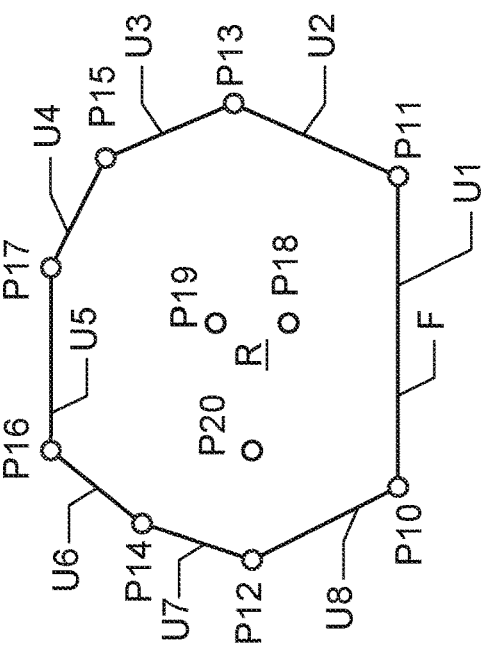
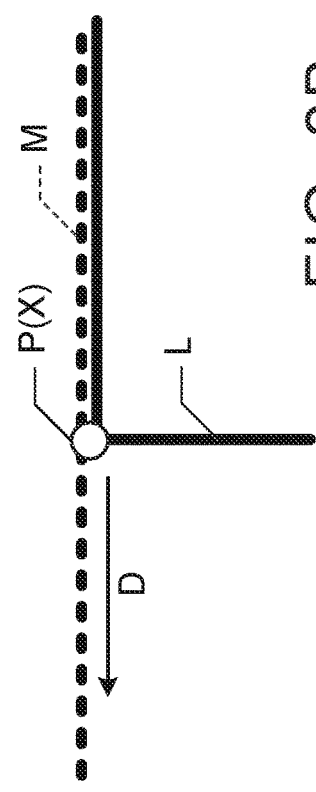
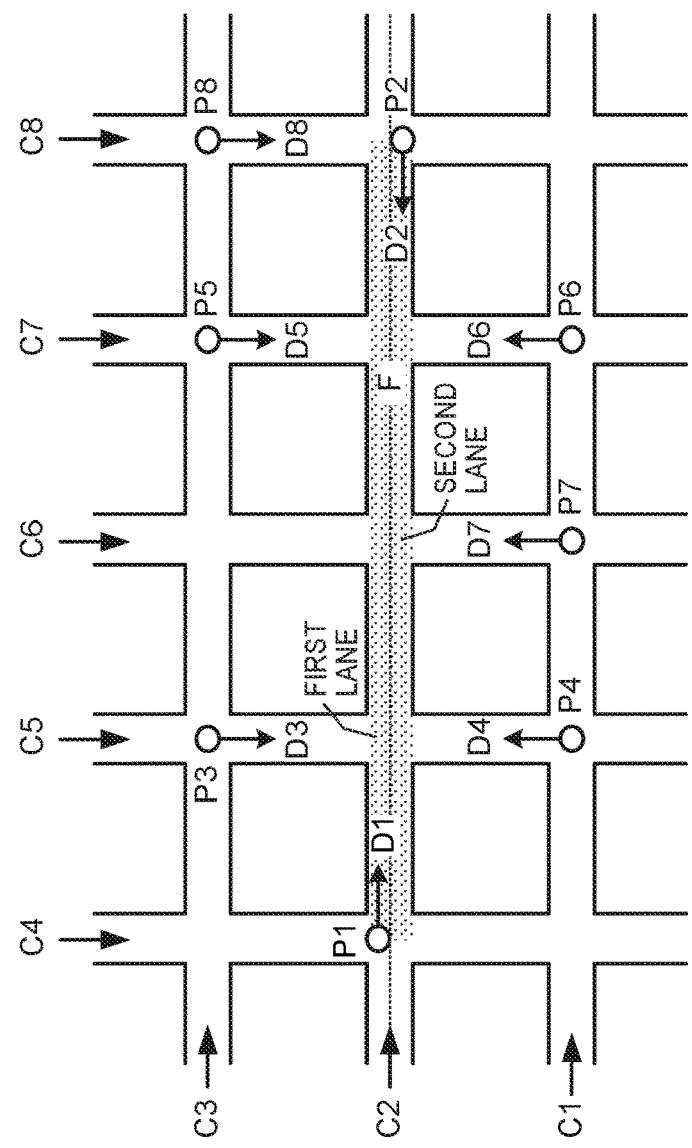

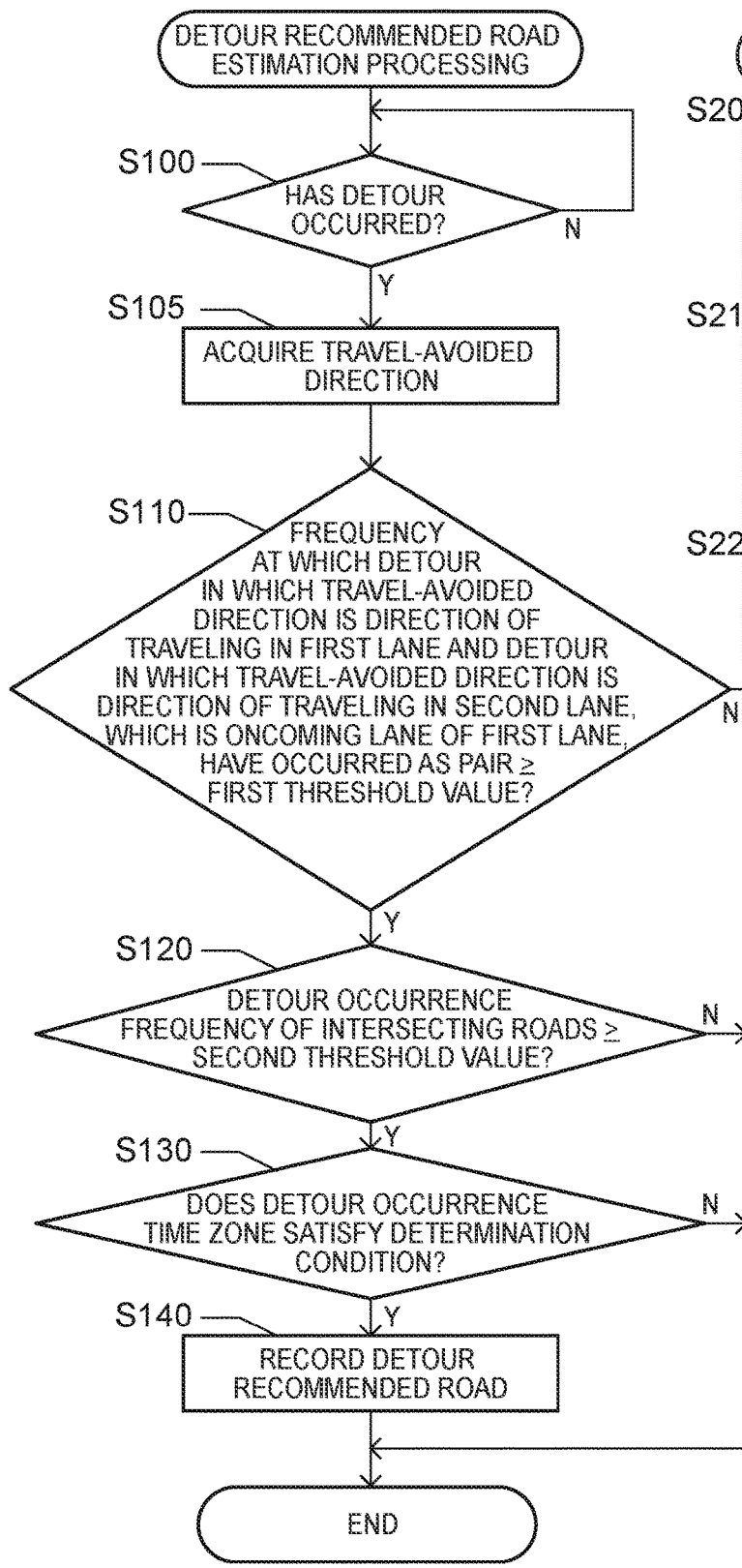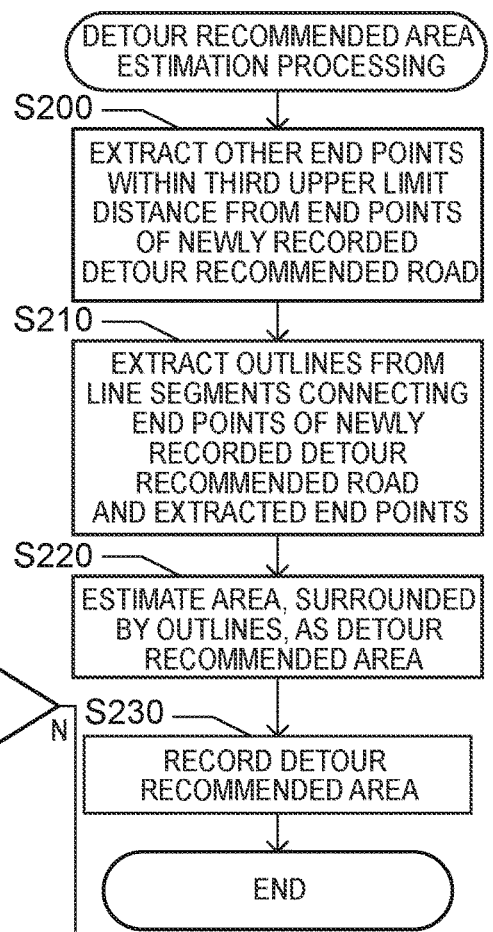

DETOUR RECOMMENDED AREA ESTIMATION SYSTEM, DETOUR RECOMMENDED AREA ESTIMATION PROGRAM, AND NAVIGATION DEVICE

INCORPORATION BY REFERENCE

The disclosure of Japanese Patent Application No. 2017-034803 filed on Feb. 27, 2017 including the specification, drawings and abstract is incorporated herein by reference in its entirety.

BACKGROUND

1. Technical Field

The present disclosure relates to a detour recommended area estimation system, a detour recommended area estimation program, and a navigation device.

2. Description of Related Art

A technology is proposed for storing the information on areas or locations where passage will be required to be inhibited, though not at present time but in the future, as passage-inhibited area information (see Japanese Patent Application Publication No. 2002-156236 (JP 2002-156236 A)). Japanese Patent Application Publication No. 2002-156236 (JP 2002-156236 A) discloses a technology for setting passage-inhibited areas not only from the viewpoint of traffic situations such as congestion, but also from the viewpoint of public security concerning the safety of occupants in the future.

SUMMARY

However, it is difficult to predict that public security will become worse in the future, with potential risk of providing incorrect guidance information on passage-inhibited areas. On the other hand, the risk of providing incorrect guidance information on passage-inhibited areas can be reduced by determining passage-inhibited areas based on the security information provided by the local government or the police. However, in this case, there is a possibility that the security information is provided for limited areas or is not provided frequently. The present disclosure provides a technology that allows the user to estimate, at an early time, detour recommended areas where public security is bad.

A first aspect of the present disclosure is a detour recommended area estimation system. The detour recommended area estimation system includes: a recording medium; and a control unit configured to collect probe information from a vehicle, acquire a travel-avoided direction based on the probe information when the vehicle made a detour, the travel-avoided direction being a direction in which the vehicle would have been traveled if the detour had not been made, estimate an area in which a direction dependence degree of the travel-avoided direction is less than a reference value as a detour recommended area and record the detour recommended area in a recording medium.

A second aspect of the present disclosure is a non-transitory computer readable medium that includes a detour recommended area estimation program. The detour recommended area estimation program causes a computer to collect probe information from a vehicle, to acquire a travel-avoided direction based on the probe information when the vehicle made a detour, the travel-avoided direction being a direction in which the vehicle would have been traveled if the detour had not been made, and to estimate an area in which a direction dependence degree of the travel-avoided direction is less than a reference value as a detour recommended area.

A third aspect of the present disclosure is a navigation device wherein the navigation device is configured to set a movement planned route that avoids the detour recommended area estimated by a detour recommended area estimation system according to a first aspect of the present disclosure.

In the configuration of the present disclosure described above, it can be estimated that an area in which the vehicle would have traveled if there had been no detour and whose direction dependence degree of the travel-avoided directions is less than the reference value is an area where it is desired to avoid traveling therein from any direction and is a detour recommended area R where security is bad. On the other hand, in an area where there is congestion or traffic control, there is a high possibility that the direction dependence degree of the travel-avoided direction becomes high. This is because the travel-avoided direction for avoiding congestion and traffic control strongly depends on the direction of the road where there is congestion or traffic control. Therefore, by estimating an area where the direction dependence degree of travel-avoided direction is less than the reference value as a detour recommended area, the possibility that an area is mistakenly estimated as a detour recommended area simply because there is congestion or traffic control in that area. In addition, collecting the probe information from the probe cars allows a detour recommended area to be identified, thus estimating the detour recommended area at an earlier time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a schematic diagram showing a detour point;

FIG. 2B is a schematic diagram showing a detour recommended road;

FIG. 2C is a schematic diagram showing a detour recommended area;

FIG. 3A is a flowchart showing the detour recommended road estimation processing; and FIG. 3B is a flowchart showing the detour recommended area estimation processing.

DETAILED DESCRIPTION OF EMBODIMENTS

Figure 1:
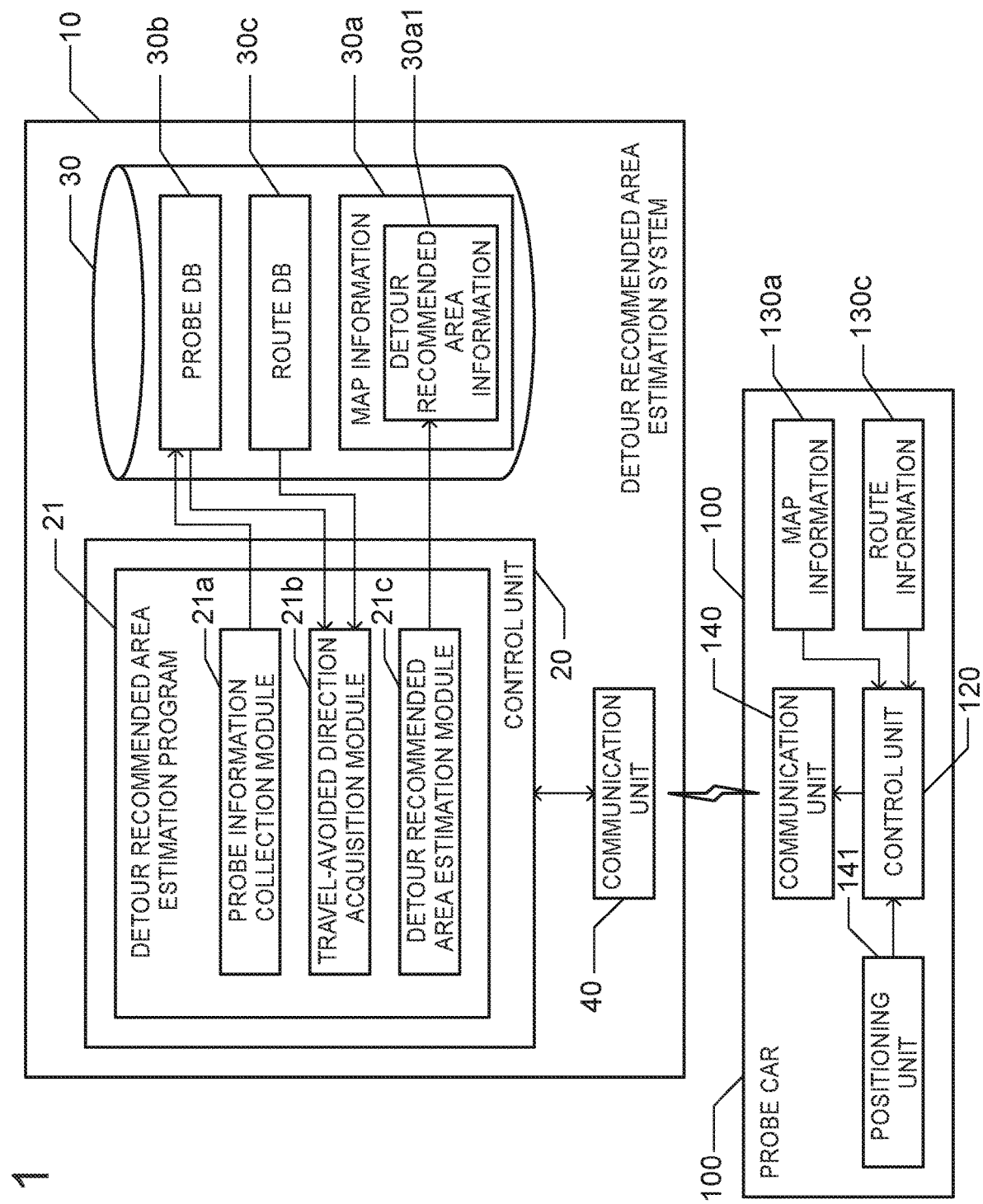
FIG. 1 is a block diagram showing a detour recommended area estimation system.

Embodiments of the present disclosure will be described below in the following order.
(1) Configuration of a detour recommended area estimation system;
(2) Processing of a detour recommended area estimation system; and
(3) Other embodiments.

(1) Configuration of a detour recommended area estimation system: FIG. 1 is a block diagram showing a configuration of a detour recommended area estimation system 10 according to one embodiment of the present disclosure. The detour recommended area estimation system 10 is, for example, a server that creates map information 30a for delivery to the in-vehicle devices mounted on many vehicles and on the host vehicle. The detour recommended area estimation system 10 includes a control unit 20 that includes a Central Processing Unit (CPU), a Random Access Memory (RAM), and a Read Only Memory (ROM), a recording medium 30, and a communication unit 40. The control unit 20 executes a detour recommended area estimation program 21 stored in the recording medium 30 or the ROM. The communication unit 40 is a communication circuit for communicating with a probe car 100.

The recording medium 30 records therein the map information 30a, a probe Database (DB) 30b, and a route Database (DB) 30c. The map information 30a includes detour recommended area information 30a1. The map information 30a includes link data that identifies the links, each connecting two nodes, and node data that indicates the nodes. A link means a road section in which a vehicle can travel, and a node means an intersection corresponding to the start point or the end point of a road section. The link data includes the information indicating which of the intersections at both ends of a road section is the starting point. A vehicle will travel from the intersection at the starting point to the other intersection, that is, the end point. The link data also includes shape interpolation point data that indicates the coordinates of a shape interpolation point that is set at the center in the width direction of a road section. The detour recommended area information 30a1 indicates a detour point, a detour recommended road, and a detour recommended area. Details of the detour point, detour recommended road, and detour recommended area will be described later.

The route DB 30c is a database that accumulates therein the route information that indicates the road sections included in the map information 30a and corresponding to a series of road sections on a movement planned route. A movement planned route in this embodiment refers to an optimum route for the probe car 100 to move from the starting point to the destination. For example, the control unit 20 searches for a movement planned route in advance using a known route search method such as the Dijkstra algorithm. The detour recommended area estimation system 10 delivers the route information to the probe cars 100 and, based on this route information, the probe cars 100 perform route guidance. In the route DB 30c, each piece of route information is recorded in association with the identification information on the probe car 100 to which the route information has been delivered.

The probe DB 30b is a database storing therein probe information. The probe information is information indicating the traveling trajectory of the probe car 100. In this embodiment, the probe information is information indicating a series of road sections actually traveled by the probe car 100.

The probe car 100 will be briefly described below. Although not shown, there are many probe cars 100 each of which can communicate with the detour recommended area estimation system 10. The probe car 100 includes a communication unit 140, a positioning unit 141, and a control unit 120. The probe car 100 records therein map information 130a and route information 130c. The map information 130a is the map information 30a that is created by the detour recommended area estimation system 10 and is delivered to the probe car 100. The route information 130c is the route information that is accumulated in the route DB 30c of the detour recommended area estimation system 10 and is delivered to the probe car 100. The control unit 120 performs route guidance on a movement planned route based on the route information 130c. Route guidance can be realized by displaying a movement planned route on the map or by outputting voice guidance for moving on a movement planned route. The communication unit 140 is a communication circuit that wirelessly communicates with the detour recommended area estimation system 10.

The positioning unit 141, configured to identify the current location of the probe car 100, includes a GPS receiver and various sensors such as a vehicle speed sensor and a gyro sensor. The control unit 120 identifies the current location based on the signals output from the various sensors of the positioning unit 141. The control unit 120 performs map matching processing using the map information 130a to sequentially identify the road sections in which the current location is present, that is, the road sections on which the probe car 100 actually traveled. The control unit 20 generates the probe information indicating a series of road sections on which the probe car 100 actually traveled. The control unit 120 sends the generated probe information to the detour recommended area estimation system 10. For example, the control unit 120 may send the probe information to the detour recommended area estimation system 10 each time the road section on which the probe car 100 travels changes.

Next, the software configuration of the detour recommended area estimation system 10 will be described. The detour recommended area estimation program 21 includes a probe information collection module 21a, a travel-avoided direction acquisition module 21b, and a detour recommended area estimation module 21c. The probe information collection module 21a, the travel-avoided direction acquisition module 21b, and the detour recommended area estimation module 21c are program modules each of which causes the control unit 20, which works as a computer, to function as the probe information collection unit, the travel-avoided direction acquisition module, and the detour recommended area estimation unit.

The control unit 20 uses the function of the probe information collection module 21a to collect the probe information from the vehicles. That is, the control unit 20 uses the function of the probe information collection module 21a to collect the probe information by receiving the probe information from many probe cars 100.

The control unit 20 uses the function of the travel-avoided direction acquisition module 21b to acquire a travel-avoided direction based on the probe information when it is determined, based on the probe information, that the vehicle that sent the probe information detoured, wherein the travel-avoided direction is the direction in which the vehicle would have been traveled if the vehicle had not detoured. The control unit 20 uses the function of the travel-avoided direction acquisition module 21b to compare the movement planned route, indicated by the route information 130c delivered to the probe car 100, and the actual traveling trajectory (a series of road sections) of the probe car 100 indicated by the probe information. If the movement planned route indicated by the route information 130c differs from a series of road sections via which the probe car 100 actually traveled, the control unit 20 determines that a detour has occurred. The control unit 20 acquires the intersection at the end point of the common part, which are included both in the movement planned route indicated by the route information 130c and in a series of road sections via which the probe car 100 actually traveled, as the detour point.

The control unit 20 acquires the direction of the movement planned route at the detour point, that is, the direction in which the probe car was to leave the intersection at the detour point on the movement planned route, as the travel-avoided direction. In addition, the control unit 20 acquires the passage time at the detour point in the traveling trajectory, indicated by the probe information, as the detour time. The control unit 20 creates an association among the detour point, the travel-avoided direction, and the detour time, and records the association in the detour recommended area information 30a1.

FIG. 2A is a schematic diagram showing a detour point P and a travel-avoided direction D. In FIG. 2A, the movement planned route M, on which the probe car 100 is to travel straight ahead in the left direction at the intersection X in the figure, is indicated by a broken line, and the actual traveling trajectory L of the probe car 100 is indicated by a solid line. The part on the right side of the intersection X is a common part between the movement planned route M and the traveling locus L, with the intersection X being the end point of the common part. Therefore, the control unit 20 acquires the intersection X as the detour point P. In addition, the control unit 20 acquires the direction in which the probe car was to leave the intersection X, which is the detour point P on the movement planned route M, as the travel-avoided direction D. More specifically, the control unit 20 derives the direction of the road section next to the intersection X on the movement planned route based on the coordinates of the node and the shape interpolation point, and acquires the derived direction as the travel-avoided direction D. When it is detected that the movement planned route M and the traveling trajectory L differ, the control unit 20 may also search (perform a reroute search) for a new movement planned route M to the original destination with the current location of the probe car 100 as the departure point.

The control unit 20 uses the function of the detour recommended area estimation module 21c to estimate an area in which the direction dependence degree of the travel-avoided direction D is less than the reference value as a detour recommended area. More specifically, the control unit 20 uses the function of the detour recommended area estimation module 21c to determine whether the direction dependence degree of the travel-avoided direction is less than the reference value, based on the frequency at which the combination of a plurality of travel-avoided directions D becomes a predetermined combination. In the description below, that the direction dependence degree of the travel-avoided directions D is less than the reference value means that the frequency at which the detour in which the travel-avoided direction D is the direction of traveling in the first lane and the detour in which the travel-avoided direction D is the direction of traveling in the second lane, which is the oncoming lane of the first lane, have occurred becomes equal to greater than a first threshold value. That is, in this embodiment, that the combination of a plurality of travel-avoided directions D becomes a predetermined combination means that a plurality of travel-avoided directions D becomes the lane directions that oppose with each other.

First, the control unit 20 uses the function of the detour recommended area estimation module 21c to acquire direct roads on the map. A direct road may be a road formed by a series of road sections having, for example, the same line name, the same road width, or the same number of lanes. A direct road may also be a road formed by a series of road sections through which the vehicle travels along a course that is determined in such a way that the change in the traveling direction is minimized while sequentially passing through the intersections.

FIG. 2B is a schematic diagram showing a detour recommended road. In FIG. 2B, it is assumed that direct roads C1 to C8, each of which is a straight road, are acquired. In the description below, it is assumed that the detour point P1 is newly acquired based on the probe information. The control unit 20 uses the function of the detour recommended area estimation module 21c to acquire other detour points P on the direct road C2 that includes the newly acquired detour point P1 and their travel-avoided directions D. The control unit 20 acquires on-direct-road detour points P1, P2, and so on that are detour points P within the first upper limit distance (for example, 10 km) from the detour point P1 on the direct road C2. Although only detour points P1 and P2 are shown on the direct road C2 for the sake of simplicity of the figure, there are practically two or more on-direct-road detour points P1, P2, and so forth on the direct road C2.

The control unit 20 acquires the travel-avoided directions D at on-direct-road detour points P1, P2, and so on. Then, the control unit 20 acquires the first-lane detour count, which is the number of on-direct-road detour points P1 and so on where the travel-avoided direction D is the same direction as the travel-avoided direction D1 at the detour point P1, and the second-lane detour count which is the number of on-direct-road detour points P2 and so on where the travel-avoided direction D is the same direction as the travel-avoided direction D2 at the detour point P2, which is the opposite direction of the travel-avoided direction D1 at the detour point P1. Furthermore, the control unit 20 acquires the smaller one of the first-lane detour count and the second-lane detour count as the opposite-direction detour occurrence frequency and, then, determines whether opposite-direction detour occurrence frequency is equal to or greater than the first threshold value (for example, 5). That is, the control unit 20 determines whether the frequency at which the detour in which the travel-avoided direction D is the direction of traveling in the first lane on the direct road C2 and the detour in which the travel-avoided direction D is the direction of traveling in the second lane, which is the oncoming lane of the first lane, have occurred as a pair is equal to or greater than the first threshold value.

If it is determined that the smaller one of the first-lane detour count and the second-lane detour count is equal to or greater than the first threshold value, the control unit 20 acquires the two on-direct-road detour points P1 and P2 with the longest distance on the direct road C2 and acquires the section between the two detour points P1 and P2 on the direct road C2 as the detour recommended road F (gray). In FIG. 2B, it is assumed that on-direct-road detour points P1 and P2 are the detour points P1 and P2 that have the longest distance on the direct road C2.

Furthermore, that the direction dependence degree of the travel-avoided directions D is less than the reference value means that the frequency at which the detour in which the travel-avoided direction D is the direction of traveling on a first road and the detour in which the travel-avoided direction D is the direction of traveling on a second road, which intersects with the first road, have occurred is equal to or greater than a second threshold value. The control unit 20 acquires the direct roads C4 to C8 that intersect with the detour recommended road F at the intersections on the detour recommended road F (including the detour points P1 and P2 at both ends). That the direct roads C4 to C8 intersect with the detour recommended road F means that the size of the intersection angle at which the detour recommended road F intersects with the roads C4 to C8 is equal to or greater than the reference value and is close to the right angle, for example, the intersection angle may be 60 to 120 degrees. In this embodiment, the control unit 20 determines whether the direction dependence degree of the travel-avoided direction is less than the reference value, based on the frequency at which the combination of a plurality of travel-avoided directions D becomes a predetermined combination. That the combination of a plurality of travel-avoided directions D becomes a predetermined combination means that the size of the intersection angle of the plurality of travel-avoided directions D is equal to or greater than the reference value and is close to the right angle.

The control unit 20 acquires the number of intersecting detour points P3 to P8 (on the direct roads C4 to C8), which are other detour points P existing in the sections whose distance from the detour recommended road F is within the predetermined second upper limit distance (for example, 5 km), as the detour occurrence frequency of the intersecting roads. The control unit 20 maintains the detour recommended road F if the number of the intersecting detour points P3 to P8 is equal to or greater than the second threshold value (for example, 5), and discards the detour recommended road F if the number of the intersecting detour points P3 to P8 is less than the second threshold value. D3 is a travel-avoided direction at the detour point P3, while D4 is a travel-avoided direction at the detour point P4, which is the opposite direction of the travel-avoided direction D3 at the detour point P3. D5 is a travel-avoided direction at the detour point P5, while D6 is a travel-avoided direction at the detour point P6, which is the opposite direction of the travel-avoided direction D5 at the detour point P5. D7 is a travel-avoided direction at the detour point P7, and D8 is a travel-avoided direction at the detour point P8.

The control unit 20 uses the function of the detour recommended area estimation module 21c to estimate an area, where the direction dependence degree of the travel-avoided directions D is less than the reference value and the detour occurrence time zone satisfies the predetermined determination condition, as a detour recommended area. The control unit 20 acquires the detour times at the on-direct-road detour points P1, P2, etc., on the detour recommended road F and the detour times at the intersecting detour points P3 to P8 on the direct roads C4 to C8 that intersect with the detour recommended road F. If the detour at the on-direct-road detour points P1, P2, and so on and the intersecting detour points P3 to P8 occurs the number of times equal to or greater than a predetermined reference number of times (for example, 5 times) at night (for example, 19:00 to 7:00 on the next day), the control unit 20 determines that the detour occurrence time zone satisfies the determination condition and determines the detour recommended road F. On the other hand, if the nighttime detour at the detour points P1, P2, and so on and the intersecting detour points P3 to P8 does not occur more than the reference number of times, the control unit 20 determines that the detour occurrence time zone does not satisfy the determination condition and discards the detour recommended road F. The control unit 20 records the determined detour recommended road F in the detour recommended area information 30a1.

The control unit 20 uses the function of the detour recommended area estimation module 21c to estimate an area, surrounded by a plurality of detour points P whose direction dependence degree of the travel-avoided direction D is less than the reference value, as a detour recommended area. More specifically, the control unit 20 estimates an area, surrounded by the detour points P that are the end points of the detour recommended road F, as a detour recommended area. Of course, the end points of the detour recommended road F correspond to the detour points P where the direction dependence degree of the travel-avoided directions D is less than the reference value.

FIG. 2C is a schematic diagram showing a detour recommended area R. In FIG. 2C, the detour recommended area R is an area within the solid line (octagon), with the vertexes being the detour points P. The control unit 20 extracts the detour points P12 to P20 which are the end points of other detour recommended roads F existing within the predetermined third upper limit distance (for example, 10 km) from the detour points P10 and P11 that are the end points of the detour recommended road F newly recorded in the detour recommended area information 30a1. Then, for all the combinations of two end points selected from the end points P10 to P20 of the extracted detour recommended roads F, the control unit 20 generates line segments each of which has any two of the detour points P10 to P20 at both ends. The control unit 20 extracts outlines U1 to U8 from the generated line segments and estimates the area inside the outlines U1 to U8 as the detour recommended area R. Each of the outlines U1 to U8 is a line segment that is the boundary of two areas, generated by dividing an area with a straight line (one of the outlines U1 to U8) as its boundary, where there are no end points P10 to P20 of the extracted detour recommended roads F in one of the two areas. For example, there are no end points P10 to P20 of the detour recommended road F in the area below the boundary of the areas generated by dividing an area with the straight line, including the outline U1, as the boundary.

The control unit 20 records polygon data, which indicates the detour recommended area R, in the detour recommended area information 30a1. If the new detour recommended area R overlaps at least a part of an existing detour recommended areas R, the control unit 20 may merge these detour recommended areas R into a single detour recommended area R. As described above, the control unit 20 searches for a movement planned route that avoids the detour recommended area R, based on the map information 30a in which the detour recommended area information 30a1 is updated, and delivers the route information 130c, which indicates the movement planned route, to the vehicles. For example, a vehicle guidance route that avoids the detour recommended area R may be searched for by making the search cost of a road section included in the detour recommended area R larger than the search cost of the other areas.

A vehicle to which the route information 130c is sent performs route guidance for guiding the vehicle on a movement planned route. That is, the vehicle to which the route information 130c is sent functions as the navigation device of the present disclosure. It should be noted that the search for the vehicle guidance route may not be performed by the detour recommended area estimation system 10, but may be performed by the navigation device in the vehicle to which the map information 30a is delivered. Furthermore, the detour recommended area estimation system 10 may deliver not only the route information 130c and the map information 30a, but also warning information, to a vehicle approaching the detour recommended area R.

In the configuration of this embodiment described above, it can be estimated that an area to which the vehicle would have traveled if there had been no detour and whose direction dependence degree of the travel-avoided directions D is less than the reference value is an area where it is desired to avoid traveling therein from any direction and is a detour recommended area R where security is bad. On the other hand, in an area where there is congestion or traffic control, there is a high possibility that the direction dependence degree of the travel-avoided direction D becomes high. This is because the travel-avoided direction D for avoiding congestion and traffic control strongly depends on the direction of the road where there is congestion or traffic control. Therefore, by estimating an area where the direction dependence degree of travel-avoided direction D is less than the reference value as a detour recommended area R, the possibility that an area is mistakenly estimated as a detour recommended area R simply because there is congestion or traffic control in that area. In addition, collecting the probe information from the probe car 100 allows the detour recommended area R to be identified, thus estimating the detour recommended area R at an earlier time.

It can be estimated that an area, in which the detour occurrence frequency in both lanes that oppose with each other is high, is the detour recommended area R where the direction dependence degree of the travel-avoided direction D at the time of the detour is low and the security is bad. In addition, in such an area, there is a low possibility that congestion and/or traffic control occurs in both lanes that are oppose with each other, with the result that it is possible to reduce the possibility of mistakenly estimating the area as the detour recommended area R simply because there is congestion or traffic control. Therefore, when the frequency at which the detour in which the travel-avoided direction D is the direction of traveling in the first lane and the detour in which the travel-avoided direction D is the direction of traveling in the second lane, which is the oncoming lane in the first lane, have occurred becomes equal to greater than the first threshold value, the control unit 20 determines that the direction dependence degree of travel-avoided direction D is less than the reference value, thereby making it possible to accurately estimate the detour recommended area R.

It can be estimated that an area, in which the detour occurrence frequency in both two roads that intersect with each other is high, is the detour recommended area R where the direction dependence degree of the travel-avoided direction D is low and the security is bad. In addition, in such an area, there is a low possibility that congestion and/or traffic control occurs in both two roads that intersect with each other and, therefore, the possibility of mistakenly estimating the area as the detour recommended area R simply because there is congestion or traffic control can be reduced. Therefore, when the frequency at which the detour in which the travel-avoided direction D is the direction of traveling on the first road and the detour in which the travel-avoided direction D is the direction of traveling on the second road, which intersects with the first road, have occurred becomes equal to greater than the second threshold value, the control unit 20 determines that the direction dependence degree of travel-avoided direction D is less than the reference value, thereby making it possible to accurately estimate the detour recommended area R.

In addition, the control unit 20 can estimate an area, in which the detour occurrence time zone satisfies the predetermined determination condition, as a detour recommended area, thus making it possible to estimate an area, in which a detour occurs in a time zone during which public safety is likely to deteriorate, as the detour recommended area R where the security is bad. Furthermore, the control unit 20 can estimate an area, in which a detour occurs in a time zone during which congestion or traffic control is unlikely to occur, as the detour recommended area R where the security is bad.

In addition, the control unit 20 estimates an area, surrounded by a plurality of detour points P whose direction dependence degree of travel-avoided direction D is less than the reference value, as the detour recommended area R. As a result, the inner area, surrounded by the plurality of detour points, can be estimated as the detour recommended area R.

(2) Processing of detour recommended area estimation system: FIG. 3A is a flowchart showing the detour recommended road estimation processing. The detour recommended road estimation processing is executed each time probe information is received. Note that the detour recommended road estimation processing may also be executed when the number of pieces of accumulated probe information becomes equal to or greater than a predetermined number. First, the control unit 20 uses the function of the travel-avoided direction acquisition module 21b to determine whether a detour has occurred (step S100). That is, as shown in FIG. 2A, the control unit 20 determines that a detour has occurred if the movement planned route indicated by the route information 130c differs from the actual traveling trajectory (a series of road sections) of the probe car 100 indicated by the probe information.

If it is not determined that a detour has occurred (step S100: N), the control unit 20 returns to the beginning of the detour recommended road estimation processing. That is, the control unit 20 waits until a detour occurs. On the other hand, if it is determined that a detour has occurred (step S100: Y), the control unit 20 uses the function of the travel-avoided direction acquisition module 21b to acquire the travel-avoided direction D (step S105). As shown in FIG. 2A, the control unit 20 acquires the direction in which the vehicle was to leave the intersection X, which is the detour point P, on the movement planned route M as travel-avoided direction D. In addition, the control unit 20 records the travel-avoided direction D, as well as the detour point P and the detour time, in the detour recommended area information 30a1.

Next, the control unit 20 uses the function of the detour recommended area estimation module 21c to determine whether the frequency (opposite-direction detour occurrence frequency) at which the detour in which the travel-avoided direction D is the direction of traveling in the first lane on the direct road C2 and the detour in which the travel-avoided direction D is the direction of traveling in the second lane, which is the oncoming lane of the first lane, have occurred as a pair is equal to greater than the first threshold value (step S110). That is, the control unit 20 determines whether the direction dependence degree of the travel-avoided direction D when a detour occurs on the direct road C2, on which there is the detour point P1 where the newly generated detour has occurred, is less than the reference value. More specifically, the control unit 20 acquires the smaller one of the first-lane detour count, which is the number of on-direct-road detour points P1 and so on where the travel-avoided direction D of the on-direct-road detour points P1, P2, and so on existing on the direct road C2 is the same direction as the travel-avoided direction D1 of the detour point P1, and the second-lane detour count, which is the number of on-direct-road detour point P2 and so on where the travel-avoided direction D is the opposite direction of the travel-avoided direction D1 at the detour point P1, as the opposite-direction detour occurrence frequency and, then, determines whether the opposite-direction detour occurrence frequency is equal to or greater than the first threshold value.

If it is not determined that the occurrence frequency of detours in which the travel-avoided directions D on the direct road C2 are opposite directions is equal to or greater than the first threshold (step S110: N), the control unit 20 returns to the beginning of the detour recommended road estimation processing. That is, the control unit 20 does not estimate the sections on the direct road C2 as the detour recommended road F.

On the other hand, if it is determined that the occurrence frequency of detours in which the travel-avoided directions D on the direct road C2 are opposite directions is equal to or greater than the first threshold (step S110: Y), the control unit 20 uses the function of the detour recommended area estimation module 21c to determine whether the detour occurrence frequency of intersecting roads is equal to or greater than the second threshold (step S120). First, the control unit 20 estimates the sections, which are on the direct road C2 including the detour point P1 where the new bypass has occurred is present and in which the opposite-direction detour occurrence frequency is equal to or greater than the first threshold value (detour points P1 to P2 in FIG. 2B), as the detour recommended road F.

Next, as shown in FIG. 2B, the control unit 20 acquires the number of intersecting detour points P3 to P8, which are included in the direct roads C4 to C8 intersecting with the detour recommended road F and which are other detour points P existing in the sections within the predetermined second upper limit distance (for example, 5 km) from the detour recommended road F, as the detour occurrence frequency of the intersecting roads, and determines whether the opposite-direction detour occurrence frequency is equal to or greater than the second threshold value.

If it is not determined that the detour occurrence frequency of the intersecting roads is equal to or greater than the second threshold value (step S120: N), the control unit 20 returns to the beginning of the detour recommended road estimation processing. That is, the control unit 20 discards the detour recommended road F estimated in step S110.

On the other hand, if it is determined that the detour occurrence frequency of the intersecting roads is equal to or greater than the second threshold value (step S120: Y), the control unit 20 uses the function of the detour recommended area estimation module 21c to determine whether the detour occurrence time zone satisfies the determination condition (step S130). More specifically, if the detours at the on-direct-road detour points P1, P2, and so on and the intersecting detour points P3 to P8 occur the number of times equal to or greater than a certain reference number of times (for example, 5 times) at night (for example, 19:00 to 7:00 on the next day), the control unit 20 determines that the detour occurrence time zone satisfies the determination condition.

If it is not determined that the detour occurrence time zone satisfies the determination condition (step S130: N), the control unit 20 returns to the beginning of the detour recommended road estimation processing. That is, the control unit 20 discards the detour recommended road F estimated in step S110.

On the other hand, if it is determined that the detour occurrence time zone satisfies the determination condition (step S130: Y), the control unit 20 uses the function of the detour recommended area estimation module 21c to record the detour recommended road F in the detour recommended area information 30a1. That is, the control unit 20 determines the detour recommended road F.

FIG. 3B is a flowchart showing the detour recommended area estimation processing. The detour recommended area estimation processing is executed each time the detour recommended road F is newly recorded. First, the control unit 20 uses the function of the detour recommended area estimation module 21c to extract other end points within the third upper limit distance (for example, 10 km) from the end points of the newly recorded detour recommended road F (step S200). As shown in FIG. 2C, the control unit 20 extracts the end points P12 to P20 of the other detour recommended roads F existing within the predetermined third upper limit distance from the end points P10 and P11 of the detour recommended road information F newly recorded in the detour recommended area information 30a1.

Next, the control unit 20 uses the function of the detour recommended area estimation module 21c to extract the outlines U1 to U8 from the line segments connecting the end points P10 and P11 of the newly recorded detour recommended road F and the extracted end points P12 to P20 (step S210). Each of the outlines U1 to U8 is a line segment that is the boundary of two areas, generated by dividing an area with a straight line (one of the outlines U1 to U8) as its boundary, where there are no end points P10 to P20 of the detour recommended roads F in one of the two areas.

Next, the control unit 20 uses the function of the detour recommended area estimation module 21c to estimate the area, surrounded by the outlines U1 to U8, as the detour recommended area R (step S220). After that, the control unit 20 uses the function of the detour recommended area estimation module 21c to record the detour recommended area R in the detour recommended area information 30a1 (step S230).

(3) Other embodiments: Although performed in the first embodiment, the processing for determining whether the time zone of the detour occurrence time satisfies the determination condition (step S130) may be omitted. That is, in the present disclosure, it is only necessary to estimate an area, where the direction dependence degree of the travel-avoided direction D is less than the reference value, as the detour recommended area R and, therefore, it is at least necessary to perform processing for determining whether the direction dependence degree of the travel-avoided direction D is less than the reference value (steps S110 and S120). Furthermore, it is only necessary to perform at least one of steps S110 and S120.

Various determination conditions may be considered for the time zone of the detour occurrence time. For example, when the time zone of the detour occurrence time is different from the time zone in which congestion occurs frequently (for example, commuting time zone), the control unit 20 may determine that the determination condition for the time zone of the detour occurrence time is satisfied. Furthermore, when the variation (standard deviation, variance, etc.) in the detour occurrence times is equal to or greater than the threshold value, the control unit 20 may determine that the determination condition for the time zone of the detour occurrence time is satisfied. Furthermore, the control unit 20 may acquire congestion information and traffic control information from the outside to estimate an area, where there is no congestion or traffic control and where the direction dependence degree of the travel-avoided direction D is less than the reference value, as the detour recommended area R.

Furthermore, it is not always necessary to determine first whether the direct road C2 is a detour recommended road F and, after that, estimate the area as the detour recommended area R based on the detour recommended road F. For example, the control unit 20 may acquire the detour points P not only on the direct road C2 but also within a certain distance and, when the variation (standard deviation, variance, etc.) in the travel-avoided directions D at the detour points P is equal to or greater than the threshold value, may estimate the area, surrounded by the detour points P, as the detour recommended area R. In this case, it is not necessary to estimate the detour recommended road F.

In addition, the travel-avoided direction D is not necessarily the direction in which the vehicle was to leave the detour point P on the movement planned route M. For example, the control unit 20 may determine that a detour has occurred when the vehicle that was to travel straight ahead turned to the right or left. In this case, the control unit 20 may acquire the traveling direction in which the vehicle has been traveling immediately before the detour point P as the travel-avoided direction D.

Furthermore, whether or not a detour has occurred may be determined, not by the detour recommended area estimation system 10, but by the probe car 100. In this case, the probe car 100 may send the probe information to the detour recommended area estimation system 10 only when a detour occurs. This probe information only need to include the information that can identify the detour point P and the travel-avoided direction D; for example, the probe information may include the information indicating the current location on a time-series basis. Furthermore, the probe information only need to be the information that can at least identify that a detour has occurred, and may be the information that requests a reroute search. In addition, the detour recommended area estimation system 10 does not necessarily have to identify the travel-avoided direction D. That is, when the probe car 100 departs from the movement planned route, the control unit 120 of the probe car 100 may identify the travel-avoided direction D and send the probe information indicating the travel-avoided direction D to the detour recommended area estimation system 10. In this case, the detour recommended area estimation system 10 does not have to record the route information indicating the movement planned route of each probe car 100, in which case, an configuration in which the probe cars 100 individually searches for its own movement planned route may also be employed.

The above embodiment is an example for implementing the present disclosure, and various other embodiments can be used. The detour recommended area estimation system of the present disclosure may be a server capable of communicating with vehicles for collecting probe information from a plurality of vehicles via communication. In addition, the detour recommended area estimation system may be implemented in a single vehicle and, based on the probe information collected for the single vehicle, the detour recommended areas may be estimated. It should be noted that detouring may mean the traveling of a vehicle that does not actually travel on a road on which the vehicle is to travel but travels on another road. For example, detouring may mean the traveling of a vehicle that, while the information on a movement planned route searched for in advance is provided, the vehicle travels, not on the road on the movement planned route, but on another road. In addition, detouring may mean the traveling of a vehicle that has been traveling directly along a road starts traveling on another road that is not the road on which the vehicle has been traveling directly. In addition, detouring may mean the traveling of a vehicle that has been traveling directly along a direct road starts traveling on another road that is not the direct road and, then, returns to the original direct road again.

The travel-avoided direction is the direction in which a vehicle will not travel because the vehicle will detour around the area in that direction. Detouring is made at intersections in most cases. Therefore, if the direction in which the vehicle was to leave an intersection is different from the direction in which the vehicle actually left the intersection, the direction in which the vehicle was to leave the intersection may be acquired as the travel-avoided direction. The direction in which the vehicle was to leave an intersection may be the exit direction in which the vehicle exits from the intersection on the movement planned route or may be the exit direction in which the vehicle exits from the intersection while traveling directly along the road. Whether or not a detour has occurred may be determined by the vehicle or the detour recommended area estimation system.

The detour recommended area estimation unit may determine whether the direction dependence degree is less than the reference value or may determine whether the direction "non" dependence degree is equal to or greater than the reference value. The direction dependence degree is an index indicating how large the deviation in the travel-avoided directions is at a detour time. Also, the direction dependence degree is an index indicating how random the travel-avoided directions are at a detour time. A detour recommended area may be an area estimated based on a location where the direction dependence degree is lower than the reference value and a detour in the travel-avoided direction occurs. A detour recommended area may be an area within a predetermined distance from that location or may be an area within the same administrative section as that location.

The detour recommended area estimation unit may determine whether the direction dependence degree of the travel-avoided direction is less than the reference value, based on the frequency at which the combination of a plurality of travel-avoided directions becomes a predetermined combination. That is, the detour recommended area estimation unit may determine whether the direction dependence degree of the travel-avoided direction is less than the reference value, based on the frequency at which a plurality of travel-avoided directions, where the combination of relatively different directions becomes a predetermined combination, have occurred. It is possible to determine whether the travel-avoided direction strongly depends on a certain direction, based on the combination of travel-avoided directions. For example, if the frequency at which a plurality of travel-avoided directions, where the combination of different directions becomes a combination that is equal to or greater than the reference, have occurred is equal to or greater than the threshold value, the detour recommended area estimation unit may determine that the direction dependence degree of the travel-avoided direction is less than the reference value.

More specifically, that the direction dependence degree of the travel-avoided direction is less than the reference value may mean that the frequency at which the detour in which the travel-avoided direction is the direction of traveling in the first lane and the detour in which the travel-avoided direction is the direction of traveling in the second lane, which is the oncoming lane of the first lane, have occurred becomes equal to greater than the first threshold value. Here, it can be estimated that an area where a detour occurred frequently in both lanes that oppose with each other is a detour recommended area where the direction dependence degree of the travel-avoided direction at the time of a detour is low and the security is bad. In addition, in both lanes that oppose with each other, the possibility of congestion and traffic control is low, with the result that it is possible to reduce the possibility of mistakenly estimating an area as a detour recommended area simply because there is congestion or traffic control.

Furthermore, that the direction dependence degree of the travel-avoided direction is less than the reference value may mean that the frequency at which the detour in which the travel-avoided direction is the direction of traveling on the first road and the detour in which the travel-avoided direction is the direction of traveling on the second road, which intersects with the first road, have occurred becomes equal to greater than the second threshold value. Here, it can be estimated that an area where a detour occurred frequently on both roads that intersect with each other is a detour recommended area where the direction dependence degree of the travel-avoided direction is low and the security is bad. In addition, on both roads that intersect with each other, the possibility of congestion and traffic control is low, with the result that it is possible to reduce the possibility of mistakenly estimating an area as a detour recommended area simply because there is congestion or traffic control. That the roads intersect may mean that the size of the angle between the two roads is equal to or greater than the reference value and is close to the right angle.

The detour recommended area estimation unit may estimate an area, where the direction dependence degree of the travel-avoided direction is less than the reference value and the detour occurrence time zone satisfies the predetermined determination condition, as a detour recommended area. This makes it possible to estimate an area, where a detour occurs in a time zone during which the public safety is likely to deteriorate, as a detour recommended area where the security is bad. In addition, the detour recommended area estimation unit can estimate that an area, where a detour occurs in a time zone during which congestion or traffic control is unlikely to occur, is a detour recommended area where the security is bad.

In addition, the detour recommended area estimation unit may estimate an area, surrounded by a plurality of detour points whose direction dependence degree of the travel-avoided direction is less than the reference value, as a detour recommended area. This makes it possible to estimate the inner area, surrounded by a plurality of detour points, as a detour recommended area. An area surrounded by a plurality of detour points may be a polygonal area, a circular area, or an elliptical area.

Furthermore, a technology for estimating an area where the direction dependence degree of a travel-avoided direction at a vehicle detour time is less than the reference value as a detour recommended area, such as one described in the present disclosure, may be implemented as a program and a method. The system, the program, and the method described above, which include various aspects. may be implemented as a single device or as a common part used with various units provided in a vehicle. For example, it is possible to provide a navigation system, a map information display system, a method, or a program that includes the above-described device. The device may be changed as necessary with a part thereof implemented by software or hardware. The present disclosure is also made possible as a non-transitory recording medium in which the program for controlling the device is stored. Of course, the recording medium of the software may be not only a magnetic recording medium or a magneto-optical recording medium but also any recording medium that will be developed in future.

What is claimed is:

1. A detour recommended area estimation system comprising:
    a recording medium; and
    a control unit configured to
    collect probe information from a vehicle,
    acquire a travel-avoided direction based on the probe information when the vehicle made a detour, the travel-avoided direction being a direction in which the vehicle leaves an intersection at a detour point on a movement planned route,
    estimate an area in which a direction dependence degree of the travel-avoided direction is less than a reference value as a detour recommended area based on a frequency at which a combination of a plurality of the travel-avoided directions becomes a predetermined combination, and record the detour recommended area in the recording medium.

2. The detour recommended area estimation system according to claim 1, wherein the control unit is configured to estimate an area in which the direction dependence degree of the travel-avoided direction is less than the reference value and a detour occurrence time zone satisfies a predetermined determination condition as the detour recommended area.

3. The detour recommended area estimation system according to claim 1, wherein the control unit is configured to estimate an area surrounded by a plurality of detour points whose direction dependence degree of the travel-avoided direction is less than the reference value as the detour recommended area.

4. A navigation device wherein the navigation device is configured to set a movement planned route that avoids the detour recommended area estimated by the detour recommended area estimation system according to claim 1.

5. The detour recommended area estimation system according to claim 1, wherein the control unit is configured to determine whether the direction dependence degree of the travel-avoided direction is less than the reference value based on the frequency at which a combination of a plurality of the travel-avoided directions becomes a predetermined combination.

6. The detour recommended area estimation system according to claim 5, wherein the direction dependence degree of the travel-avoided direction which is less than the reference value indicates that a frequency at which a detour in which the travel-avoided direction is a direction of traveling in a first lane and a detour in which the travel-avoided direction is a direction of traveling in a second lane have occurred is equal to or greater than a first threshold value, the second lane being an oncoming lane of the first lane.

7. The detour recommended area estimation system according to claim 5, wherein the direction dependence degree of the travel-avoided direction which is less than the reference value indicates that a frequency at which a detour in which the travel-avoided direction is a direction of traveling on a first road and a detour in which the travel-avoided direction is a direction of traveling on a second road have occurred is equal to or greater than a second threshold value, the second road intersecting with the first road.

8. A non-transitory computer readable medium comprising a detour recommended area estimation program, the detour recommended area estimation program causing a computer to:
    collect probe information from a vehicle,
    acquire a travel-avoided direction based on the probe information when the vehicle made a detour, the travel-avoided direction being a direction in which the vehicle leaves an intersection at a detour point on a movement planned route, and
    estimate an area in which a direction dependence degree of the travel-avoided direction is less than a reference value as a detour recommended area based on a frequency at which a combination of a plurality of the travel-avoided directions becomes a predetermined combination.

* * * * *